(12) United States Patent
Bickham et al.

(10) Patent No.: US 7,555,187 B2
(45) Date of Patent: Jun. 30, 2009

(54) LARGE EFFECTIVE AREA FIBER

(75) Inventors: Scott Robertson Bickham, Corning, NY (US); Dana Craig Bookbinder, Corning, NY (US); Xin Chen, Corning, NY (US); Ming-Jun Li, Horseheads, NY (US); Snigdharaj Kumar Mishra, Wilmington, NC (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/151,171

(22) Filed: May 5, 2008

(65) Prior Publication Data

US 2008/0279517 A1 Nov. 13, 2008

Related U.S. Application Data

(60) Provisional application No. 60/927,989, filed on May 7, 2007.

(51) Int. Cl.
*G02B 6/036* (2006.01)
(52) U.S. Cl. .................................... 385/127; 385/125
(58) Field of Classification Search .................. None
See application file for complete search history.

(56) References Cited

U.S. PATENT DOCUMENTS

| | | | | |
|---|---|---|---|---|
| 5,155,792 | A * | 10/1992 | Vali et al. .................... | 385/125 |
| 6,335,995 | B1 | 1/2002 | Kato et al. .................. | 385/123 |
| 6,418,258 | B1 * | 7/2002 | Wang .......................... | 385/125 |
| 6,477,305 | B1 | 11/2002 | Berkey et al. ................ | 385/123 |

(Continued)

FOREIGN PATENT DOCUMENTS

EP 1477831 11/2004

(Continued)

OTHER PUBLICATIONS

"Single-Mode Fiber Optics", Principles and Applications; Second Edition, Revised and Expanded; Luc B. Jeunhomme, Photonetics; p. 39-44.

*Primary Examiner*—Mike Stahl
(74) *Attorney, Agent, or Firm*—Svetlana A. Short

(57) ABSTRACT

An optical fiber according to an embodiment of the present invention comprises: a glass core extending from a centerline to a radius $R_1$ wherein $R_1$ is greater than about 5 μm; a glass cladding surrounding and in contact with the core, the cladding comprising: (i) a first annular region extending from the radius $R_1$ to a radius $R_2$, the first annular region comprising a radial width, $W_2 = R_2 - R_1$, (ii) a second annular region extending from the radius $R_2$ to a radius $R_3$, and comprising a radial width, $W_3 = R_3 - R_2$, and (iii) a third annular region surrounding the second annular region and extending from the radius $R_3$ to an outermost glass radius $R_4$; wherein the core comprises a maximum relative refractive index, $\Delta_{1MAX}$, relative to the third annular region, and wherein $\Delta_{1MAX}$ is greater than about 0.1% and less than about 0.3%; the first annular region has a refractive index delta $\Delta_2(r)$ is less than about 0.025%; wherein the second annular region comprises a minimum relative refractive index, $\Delta_{3MIN}$, relative to the third annular region;

wherein $\Delta_{1MAX} > \Delta_{2MAX} > \Delta_{3MIN}$, and $\Delta_{2MIN} > \Delta_{3MIN} < 0$; and wherein the core and the cladding provide a fiber with cable cutoff less than 1500 nm, and an effective area at 1550 nm greater than 95 μm² and bend loss of ≦0.5 dB/turn on a 20 mm diameter mandrel.

26 Claims, 2 Drawing Sheets

U.S. PATENT DOCUMENTS

| | | | |
|---|---|---|---|
| 6,801,699 B1 | 10/2004 | Bickham et al. | 385/123 |
| 6,904,218 B2 | 6/2005 | Sun et al. | 385/127 |
| 6,904,772 B2 | 6/2005 | Berkey et al. | 65/412 |
| 7,139,458 B2 | 11/2006 | Koh et al. | 385/127 |
| 7,272,289 B2 | 9/2007 | Bickham et al. | 385/128 |
| 7,313,312 B2 | 12/2007 | Kimball et al. | 385/142 |
| 7,433,566 B2 | 10/2008 | Bookbinder et al. | 385/128 |
| 7,450,806 B2 | 11/2008 | Bookbinder et al. | 385/125 |
| 7,450,807 B2 | 11/2008 | Bickham et al. | 385/126 |
| 2002/0186941 A1* | 12/2002 | Hsu et al. | 385/123 |
| 2005/0244120 A1* | 11/2005 | Mishra | 385/127 |
| 2006/0120678 A1 | 6/2006 | Manyam et al. | 382/125 |
| 2007/0098339 A1 | 5/2007 | Bringuier et al. | 385/106 |
| 2007/0258686 A1* | 11/2007 | De Montmorillon et al. | 385/127 |
| 2008/0056654 A1 | 3/2008 | Bickham et al. | 385/124 |
| 2008/0056658 A1 | 3/2008 | Bickham et al. | 385/127 |

FOREIGN PATENT DOCUMENTS

| | | |
|---|---|---|
| EP | 1978383 | 10/2008 |
| WO | WO01/47822 | 7/2001 |

* cited by examiner

LARGE EFFECTIVE AREA FIBER

This application claims the benefit of U.S. Provisional Application No. 60/927,989 filed May 7, 2007, entitled "Large Effective Area Fiber".

BACKGROUND OF THE INVENTION

1. Field of the Invention

The present invention relates generally to optical fiber, and particularly optical fibers which have large effective area and low bend loss at 1550 nm.

2. Technical Background

Optical amplifier technology and wavelength division multiplexing techniques are typically required in telecommunication systems that provide high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. In some applications, single power levels of 1 mW or less are still sensitive to non-linear effects, so that the effective area is still an important consideration in such lower power systems.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems.

On the other hand, an increase in effective area of an optical waveguide fiber typically results in an increase in macrobending induced losses which attenuate signal transmission through a fiber. The macrobending losses become increasingly significant over long (e.g., 100 km, or more) distances (or spacing between regenerators, amplifiers, transmitters and/or receivers. Unfortunately, the larger the effective area of a conventional optical fiber is, the higher the macrobend induced losses tend to be.

Communication systems which typically require one gigabyte per second, and higher, transmission rates, together with regenerators spacing in excess of 100 km, typically make use of optical amplifier technology and/or wavelength division multiplexing techniques. Thus, waveguide fiber manufacturers have designed waveguides which are less susceptible to non-linear effects induced by higher power signals or by four wave mixing, which can occur in multiplexing systems.

SUMMARY OF THE INVENTION

According to one aspect of the present invention an optical fiber comprises: a glass core extending from a centerline to a radius $R_1$ wherein $R_1$ is greater than about 5 μm; a glass cladding surrounding and in contact with the core; wherein the core and the cladding provide a fiber with cable cutoff less than 1500 nm, and an effective area at 1550 nm greater than 95 μm² and bend loss of ≤0.7 dB/turn on a 20 mm diameter mandrel. In some embodiments the effective area at 1550 nm is greater than 110 μm² and in some embodiments the effective area at 1550 nm is greater than 115 μm². Preferably the cladding contains an annular region of silica based glass with at least 10 (and more preferably at least 50) randomly dispersed closed holes situated therein, and (i) mean distance between the holes is less than 5000 nm, and (ii) at least 80% of the holes have a maximum cross-sectional dimension Di of less than 1000 nm. Preferably the bend loss at 1550 nm is less than 0.5 dB/turn, less than 0.25 dB/turn, and more preferably less than 0.1 dB/turn, on a 20 mm diameter mandrel. In some exemplary embodiments the bend loss at 1550 nm is less than 0.08 dB/turn, and an in some exemplary embodiments the bend loss than 0.06 dB/turn on a 20 mm diameter mandrel.

According to one exemplary embodiment of the present invention an optical fiber comprises:

a glass core extending from a centerline to a radius $R_1$ wherein $R_1$ is greater than about 5 μm;

a glass cladding surrounding and in contact with the core, the cladding comprising: (i) a first annular region extending from the radius $R_1$ to a radius $R_2$, the first annular region comprising a radial width, $W_2 = R_2 - R_1$, (ii) a second annular region extending from the radius $R_2$ to a radius $R_3$, and comprising a radial width, $W_3 = R_3 - R_2$, and (iii) a third annular region surrounding the second annular region and extending from the radius $R_3$ to an outermost glass radius $R_4$;

wherein the core comprises a maximum relative refractive index, $\Delta_{1MAX}$, relative to the third annular region, and wherein $\Delta_{1MAX}$ is greater than about 0.1% and less than about 0.3%;

wherein the first annular region has a maximum refractive index delta $\Delta_{2MAX}(r)$ less than about 0.025% and greater than about −0.025%;

wherein the second annular region comprises:

a minimum relative refractive index, $\Delta_{3MIN}$, relative to the third annular region;

wherein $\Delta_{1MAX} > \Delta_{2MAX} > \Delta_{3MIN}$, and $\Delta_{3MIN} < 0$; and wherein the core and the cladding provide a fiber with cable cutoff less than 1500 nm, and an effective area at 1550 nm greater than 110 μm². In some exemplary embodiments the optical fiber has an effective area at 1550 nm greater than 125 μm². In some exemplary embodiments the optical fiber has an effective area at 1550 nm greater than 135 dm².

In one set of embodiments, the second annular region comprises silica glass having a dopant selected from the group consisting of germanium, aluminum, phosphorus, titanium, boron, and fluorine.

In another set of embodiments, the second annular region comprises silica glass with a plurality of closed holes, the holes being either empty (vacuum) or gas filled, wherein the holes provide internal reflection of light, thereby providing wave guiding to light traveling along the core. Such holes can provide an effective refractive index which is low, e.g. compared to pure silica.

According to one exemplary embodiment an optical fiber comprises:

a glass core extending from a centerline to a radius $R_1$ wherein $R_1$ is greater than about 5 μm and a glass cladding surrounding and in contact with the core, the cladding comprising: (i) a first annular region extending from $R_1$ to a radius $R_2$, the first annular region comprising a radial width, $W_2 = R_2 - R_1$, (ii) a second annular region extending from $R_2$ to a radius $R_3$, and comprising a radial width, $W_3 = R_3 - R_2$, and (iii) a third annular region surrounding the second annular region and extending from the radius $R_3$ to an outermost glass radius $R_4$;

wherein the core comprises a maximum relative refractive index, $\Delta_{1MAX}$, relative to the third annular region, and wherein $\Delta_{1MAX}$ is greater than about 0.1% and less than about 0.3%;

wherein the first annular region has a maximum refractive index delta $\Delta_{2MAX}(r)$ less than about 0.025% and greater than about −0.025%;

wherein the second annular region comprises:
a minimum relative refractive index, $\Delta_{3MIN}$, relative to the third annular region; wherein $\Delta_{1MAX} > \Delta_{2MAX} > \Delta_{3MIN}$, and $\Delta_{3MIN} < 0$, and includes silica based glass with at least 10 randomly dispersed closed holes situated therein, and (i) mean distance between the holes is less than 5000 nm, and (ii) at least 80% of the holes have a maximum cross-sectional dimension Di of less than 1000 nm; and wherein the core and the cladding provide a fiber with cable cutoff less than 1500 nm, and an effective area at 1550 nm greater than 95 μm².

Reference will now be made in detail to the present preferred embodiments of the invention, examples of which are illustrated in the accompanying drawings.

DETAILED DESCRIPTION OF THE PREFERRED EMBODIMENT

Figure 1:
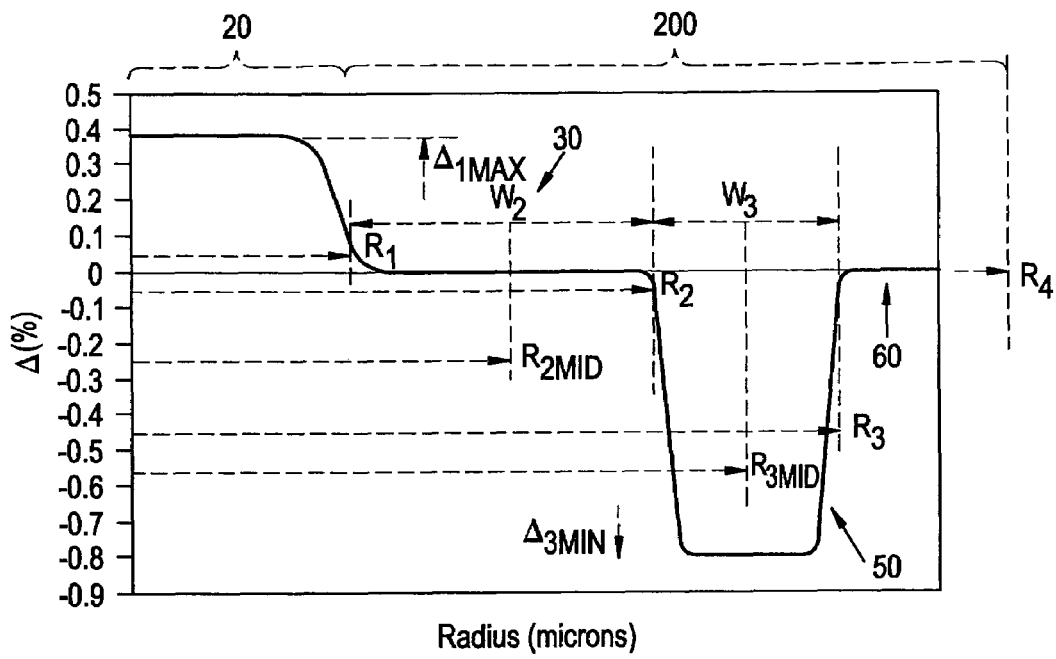
FIG. 1 shows a relative refractive index profile of an embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the third annular region 60 (outer region) of the cladding. As used herein, the relative refractive index is represented by $\Delta$ and its values are given in units of "%", unless otherwise specified. In cases where the refractive index of a region is less than the average refractive index of the third annular region 60, the relative index percent is negative and is referred to as having a depressed region or depressed index, and the minimum relative refractive index is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff} = 2\pi (\int f^2 \, r \, dr)^2 / (\int f^4 \, r \, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of $\Delta(r)$ which is in units of "%", where r is radius, which follows the equation, $$\Delta(r) = \Delta(r_0)(1 - [|r - r_0|/(r_1 - r_0)]^\alpha),$$

where $r_0$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, $2w = MFD$, and $w^2 = (2 \int f^2 \, r \, dr / \int [df/dr]^2 \, r \, dr)$, the integral limits being 0 to ∞.

The bend resistance of a waveguide fiber can be gauged by induced attenuation under prescribed test conditions, for example by deploying or wrapping the fiber around a mandrel of a prescribed diameter.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170". By cable cutoff as used herein, we mean the value obtained using the approximated test.

Unless otherwise noted herein, optical properties (such as dispersion, dispersion slope, etc.) are reported for the LP01 mode. Unless otherwise noted herein, a wavelength of 1550 nm is the reference wavelength.

Figure 2:
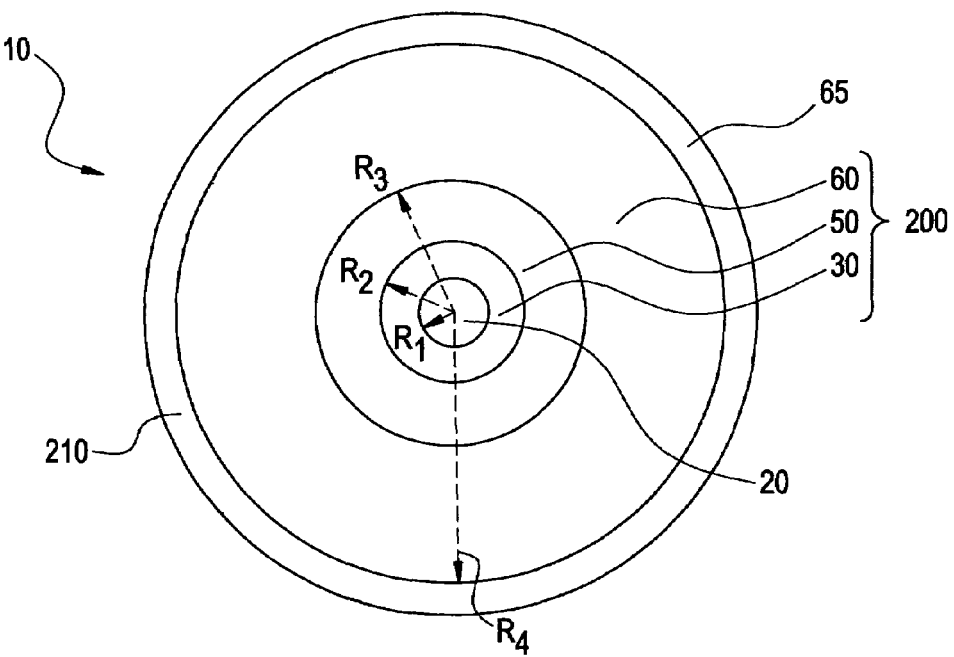
FIG. 2 is a schematic cross-sectional view of an embodiment of an optical waveguide fiber as disclosed herein.
Figure 3:
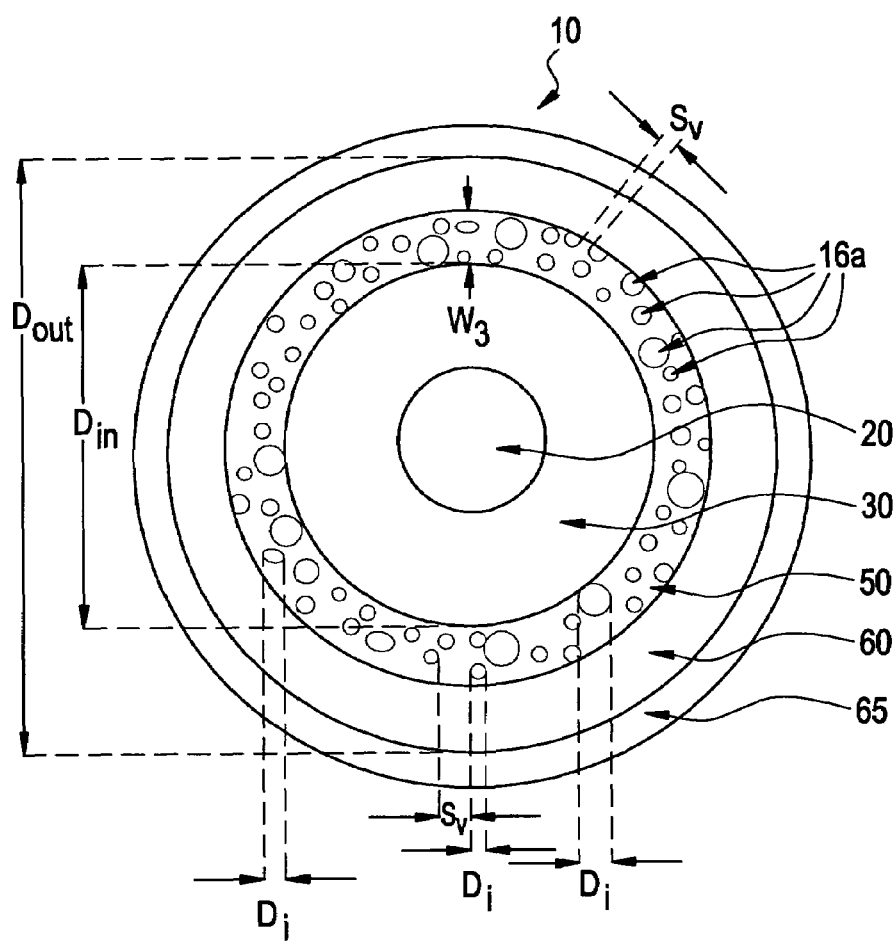
FIG. 3 is a schematic cross-sectional view of another embodiment of an optical waveguide according to the present invention.

Referring to FIGS. 1-3, the optical fiber 10 disclosed herein comprises a core 20 and a cladding layer (or cladding) 200 surrounding and directly adjacent the core. The core 20 has a refractive index profile, $\Delta_{Core}(r)$. The cladding 200 has a refractive index profile, $\Delta_{CLAD}(r)$. In some embodiments, the cladding 200 comprises a region of pure silica surrounded by region containing random air holes situated within Si based glass.

In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

In some embodiments, the refractive index profile of the optical fiber 10 disclosed herein is non-negative from the centerline to the inner radius $R_2$ of the annular region 30. In some embodiments, the optical fiber 10 contains no index-decreasing dopants in the core 20.

Referring to FIGS. 1 and 2 optical waveguide fibers 10 are disclosed herein which comprise: a core 20 extending radially outwardly from the centerline to a central segment outer radius, $R_1$ (preferably >5 µm), and having a relative refractive index profile, $\Delta_1(r)$ in %, with a maximum relative refractive index percent, $\Delta_{1MAX}$ (preferably $\leq 0.3\%$ and greater than 0.1%); and, a cladding 200 surrounding and directly adjacent, i.e. in direct contact with, the core 20. Cladding 200 comprises: a first annular region 30 surrounding the core 20 and directly adjacent thereto, extending radially outwardly to a second annular region 50 and characterized by radius $R_2$, this region 30 having a width $W_2$ ($W_2=R_2-R_1$), and a relative refractive index profile, $\Delta_2(r)$ in %, with a maximum relative refractive index percent, $\Delta_{2MAX}$, in % (where $\Delta_{2MAX}$ is preferably less than about 0.025% and preferably greater than about −0.025%), a minimum relative refractive index percent, $\Delta_{2MIN}$, in %; a second annular region 50 surrounding region 30 and directly adjacent thereto, and extending radially outwardly from $R_2$ to an radius $R_3$, the region 50 having a width $W_3$, and having a relative refractive index profile, $\Delta_3(r)$ in percent (%), with a minimum relative refractive index percent, $\Delta_{3MIN}$, in % (preferably $\Delta_{3MIN} \leq -0.3\%$), wherein $\Delta_{1MAX} > 0 > \Delta_{3MIN}$; and a third annular region 60 surrounding the region 50 and directly adjacent thereto and having a relative refractive index percent, $\Delta_4(r)$ in %. $R_1$ is defined to occur at the radius where $\Delta_1(r)$ first reaches +0.05%. That is, core 20 ends and the annular region 30 starts where the relative refractive index first reaches +0.05% (going outward radially) at a radius $R_1$, and region 30 is defined to end at a radius $R_2$ where the relative refractive index $\Delta_2(r)$ first reaches −0.05%, going outward radially. The second annular region 50 begins at $R_2$ and ends at $R_3$ for this group of embodiments. $R_3$ is defined to occur where the relative refractive index $\Delta_3(r)$ reaches the value of −0.05% (going outward radially), after $\Delta_3(r)$ has dipped to at least −0.05%. The width $W_3$ of the second annular region 50 is $R_3-R_2$ and its midpoint is $R_{3MID}$ is $(R_2+R_3)/2$. In some embodiments, more than 90% of the core 20 has a positive relative refractive index, and in some embodiments $\Delta_1(r)$ is positive for all radii from 0 to $R_1$. In some embodiments, $|\Delta_2(r)| < 0.025\%$ and $|\Delta_{2max} - \Delta_{2min}| < 0.05\%$ for more than 50% of the radial width of the first annular region 30, and in other embodiments $|\Delta_2(r)| < 0.01\%$ for more than 50% of the radial width of the first annular region 30. $\Delta_3(r)$ is negative for all radii from $R_2$ to $R_3$. Preferably, $\Delta_{CLAD}(r)=0\%$ for all radii greater than 30 µm. Cladding 200 extends to a radius, $R_4$, which is also the outermost periphery of the glass part of the optical fiber. Also, $\Delta_{1MAX} > \Delta_{2MAX} > \Delta_{3MIN}$, and $\Delta_{2MIN} > \Delta_{3MIN}$.

In one set of embodiments, depicted in FIGS. 1 and 2, the second annular region 50 comprises silica glass having at least one dopant selected from the group consisting of germanium, aluminum, phosphorus, titanium, boron, and fluorine. In another set of embodiments FIG. 3), the second annular region 50 comprises silica based glass (either pure silica, or silica doped with for example, germanium, aluminum, phosphorus, titanium, boron, and fluorine) with a plurality of closed randomly dispersed holes 16A, the holes 16A being either empty (vacuum) or gas (e.g. argon, or air) filled. Such holes can provide an effective refractive index which is low, e.g. compared to pure silica.

More specifically, referring to FIG. 3, the fiber core region 20 (with a step index, $n_1$,) is surrounded by the first annular region 30 (with an index, $n_2$), which is situated adjacent to and is surrounded by the second annular region 50 having radial width, w3, which is further surrounded by a third annular region 60 (with an index, $n_4$, and a radial width, w4), which can optionally be surrounded by one or more polymer coatings 65. The relative percent index of refraction ($\Delta n$ %) in second annular region 50 fluctuates between −28% (index of void filled gas relative to that of silica) and that of the glass surrounding the holes (in this example it is silica, with the relative % index of refraction $\Delta n_5$ of about 0%). A typical average relative refractive index percent $\Delta n_{ave}$ of the second annular region 50 will be between −2% and −3%, relative to pure silica glass, depending on the dopants present in the glass surrounding the holes. That is, the index second annular region 50 fluctuates, and in the example of FIG. 3, the width of the gas filled holes, and/or the glass filled spacing $S_v$ between the gas filled holes is randomly distributed and/or are not equal to one another. That is, the holes are non-periodic. It is preferable that the mean distance between the holes is less than 5000 nm, more preferably less than 2000 nm, even more preferably less than 1000 nm, for example 750 nm, 500 nm, 400 nm, 300 nm, 200 nm or 100 nm. Preferably, at least 80%, and more preferably at least 90% of the holes have a maximum cross-sectional dimension Di of less than 1000 nm, preferably less than 500 nm. Even more preferably, the mean diameter of the holes is less than 1000 nm, more preferably less than 500 nm, and even more preferably less than 300 nm. The holes 16A are closed (surrounded by solid material) and are non-periodic. That is, the holes 16A may have the same size, or may be of different sizes. The distances between holes may be uniform (i.e., the same), or may be different. Preferably the second annular region 50 contains at least 10 holes, more preferably at least 50 holes, even more preferably at least 100 holes and most preferably at least 200 holes.

The core 20 has a profile volume, $V_1$, defined herein as:

$$2\int_0^{R_1} \Delta_1(r) r\, dr.$$

The second annular region 50 has a profile volume, $V_3$, defined herein as:

$$2\int_{R_2}^{R_3} \Delta_3(r) r\, dr.$$

Preferably, $\Delta_{1MAX} < 0.3\%$, $\Delta_{2MIN} > -0.05\%$, $\Delta_{2MAX} < 0.05\%$, $\Delta_{3MIN} < -0.3\%$, $0.1 < R_1/R_2 < 0.6$, and the absolute magnitude of the profile volume of the second annular region, $|V_3|$, is greater than 20%-µm². Preferably, $\Delta_{3MIN} < -0.3\%$, More preferably, $\Delta_{3MIN} < -0.45\%$, and even more preferably $\leq -0.7\%$. When we say, for example, $\Delta < -0.5\%$, we mean $\Delta$ is more negative than −0.5%. Preferably $0.15 < R_1/R_2 < 0.5$. In some embodiments, $0.2<R_1/R_2\leq0.4$, for example $R_1/R_2=0.25$, 0.28, 0.3, 0.33, 0.35, 0.38, or 0.4. In other embodiments, $0.3<R_1/R_2\leq0.4$.

In some embodiments $W_2>\frac{2}{3}R_1$, in some embodiments $W_2>R_1$, and in some embodiments, $W_2>2R_1$. In some embodiments $W_2>5$ µm. For example, $W_2$ may be at least: 5.5 µm, 8 µm, or even greater than 10 µm. Preferably, 10 µm$<W_2<16$ µm.

In some embodiments, 20%-µm²$<|V_3|<$250%-µm². In some embodiments, 30%-µm²$<|V_3|<$240%-µm². In some embodiments, 40%-µm²$<|V_3|<$221%-µm², for example $|V_3|$ is 50%-µm², 60%-µm², 70%-µm², 80%-µm², 90%-µm², 100%-µm², 110%-µm², 120%-µm², 130%-µm², 140%-µm², 150-µm², or 160-µm².

In some embodiments, 0.1%$<\Delta_{1MAX}<$0.3%, preferably 0.17%$<\Delta_{1MAX}<$0.28%, or more preferably 0.17%$<\Delta_{1MAX}<$0.25%.

Preferably, $7.2\geq R_1\geq5.0$ µm, more preferably $7.0\geq R_1\geq5.3$.

Preferably, $R_2>8$ µm, more preferably $>12$ µm and, in some embodiments, equal to or greater than about 15.0 µm, for example $R_2\geq20$ µm. In some embodiments $W_2$ is between about 3 µm and 18 µm, and in some embodiments, $W_2$ is between about 7 µm and 15 µm.

Preferably, $R_3>11.0$ µm, and in some embodiments 11.5 µm$<R_3<30.0$ µm, for example, $R_3$ is about 12 µm, 13 µm, 15 µm or 20 µm.

In some embodiments $W_3>1.0$ µm, in some embodiments $W_3>2.0$ µm, for example $2.0<W_3<10.0$ µm. In some embodiments $W_3$ is less than 6.0 µm, and in some embodiments $3.0\leq W_3\leq9.0$ µm, and in some embodiments $3.0\leq W_3\leq7.0$ µm. Also in some embodiments, $\Delta_{3MIN}$ is less than −0.35%, and in some other embodiments, less than −0.5%.

Preferably, $R_4>50$ µm. In some embodiments, $R_4\geq55$ µm. In other embodiments, $R_4\geq60$ µm. In some embodiments, 60 µm$\leq R_4\leq90$ µm. For example, $R_4$ may be 62.5 µm, 70 µm, 75 µm, 80 µm, or 85 µm.

In some embodiments, the central segment of the core 20 may comprise a relative refractive index profile having a so-called centerline dip which may occur as a result of one or more optical fiber manufacturing techniques. For example, the central segment may have a local minimum in the refractive index profile at radii less than 1 µm, wherein higher values for the relative refractive index (including the maximum relative refractive index for the core segment) occur at radii greater than r=0 µm.

Preferably, the optical fiber disclosed herein provides: a mode field diameter at 1550 nm is greater than 11 µm, and in some embodiments, between 11 µm and 15 µm, more preferably between 12.5 µm and 14.5 µm. Preferably, the effective area at 1550 nm is greater than 110 µm², more preferably greater than 115 µm², more preferably greater than 125 µm², even more preferably greater than 135 µm², and in some embodiments greater than 145 µm².

Exemplary Embodiments

Tables 1-2 list characteristics of illustrative examples 1-7. The refractive index profiles of Examples 1-7 are similar to the fibers of FIGS. 1-3, with the following respective values. Note that in these examples $\Delta_2$% is about 0.0 (silica).

TABLE 1

The fiber parameters of several examples

| | Examples | | | | | | |
|---|---|---|---|---|---|---|---|
| | Fiber 1 | Fiber 2 | Fiber 3 | Fiber 4 | Fiber 5 | Fiber 6 | Fiber 7 |
| $\Delta_{1MAX}$(%) | 0.295 | 0.270 | 0.243 | 0.243 | 0.220 | 0.200 | 0.190 |
| R1 (µm) | 5.45 | 5.50 | 5.92 | 5.92 | 5.53 | 6.09 | 6.78 |
| Core Alpha | 9.0 | 20.0 | 7.0 | 7.0 | 100.0 | 7.0 | 8.0 |
| V1 (%-µm²) | 7.17 | 8.15 | 6.62 | 6.62 | 6.58 | 6.35 | 6.99 |
| R2 (µm) | 18.0 | 16.0 | 12.1 | 19.0 | 20.0 | 19.0 | 21.0 |
| R1/R2 | 0.30 | 0.34 | 0.49 | 0.31 | 0.28 | 0.32 | 0.32 |
| R2MID (µm) | 11.73 | 10.75 | 9.01 | 12.46 | 12.76 | 12.55 | 13.89 |
| W2 (µm) | 12.55 | 10.50 | 6.18 | 13.08 | 14.47 | 12.91 | 14.22 |
| W3 (µm) | 3.0 | 3.5 | 2.4 | 4.0 | 4.5 | 6.0 | 6.5 |
| $\Delta_{3MIN}$(%) | −0.50 | −0.50 | −0.50 | −0.50 | −0.50 | −0.70 | −0.70 |
| R3MID | 19.50 | 17.75 | 13.30 | 21.00 | 22.25 | 22.00 | 24.25 |
| |V3| (µm² %) | 58.5 | 62.1 | 31.9 | 84.0 | 100.1 | 184.8 | 220.7 |

TABLE 2

The properties of several exemplary fibers.

| | Examples | | | | | | |
|---|---|---|---|---|---|---|---|
| | Fiber 1 | Fiber 2 | Fiber 3 | Fiber 4 | Fiber 5 | Fiber 6 | Fiber 7 |
| MFD in microns, at 1550 nm | 11.40 | 11.92 | 12.2 | 12.52 | 12.98 | 13.615 | 14.196 |
| Aeff at 1550 nm (µm²) | 100.50 | 110.5 | 116.05 | 119.84 | 130.04 | 140.67 | 155.04 |
| Dispersion at 1550 nm (ps/nm/km) | 18.63 | 19.08 | 20.25 | 18.82 | 19.14 | 18.931 | 19.77 |
| Slope at 1550 nm (ps/nm²/km) | 0.060 | 0.060 | 0.064 | 0.061 | 0.061 | 0.063 | 0.062 |

TABLE 2-continued

The properties of several exemplary fibers.

| | Examples | | | | | | |
|---|---|---|---|---|---|---|---|
| | Fiber 1 | Fiber 2 | Fiber 3 | Fiber 4 | Fiber 5 | Fiber 6 | Fiber 7 |
| Kappa at 1550 nm (nm) | 309 | 318 | 316 | 307 | 313 | 302 | 317 |
| Relative Bend Loss at 20 mm Diameter at 1550 nm | 0.03 | 0.04 | 0.56 | 0.08 | 0.10 | 0.01 | 0.01 |
| Relative Bend Loss at 1550 nm 30 mm Diameter | 0.02 | 0.10 | 4.07 | 0.25 | 0.22 | 0.04 | 0.01 |
| Theoretical Cutoff of Core (nm) | 1379 | 1443 | 1353 | 1353 | 1361 | 1263 | 1391 |

Relative Bend Loss values are calculated relative to those of SMF-28e® fiber.

According to the exemplary embodiments of the present invention the exemplary optical fibers have effective area (Aeff) of 95 µm² to 180 µm² (at 1550 nm) and/or MFD between about 11 µm and 15 µm. These fibers also have chromatic dispersion values between about 17 ps/nm/km and about 21 ps/nm/km at 1550 nm, and dispersion slope between 0.05 ps/nm²/km and 0.07 ps/nm²/km. The kappa value, defined as the ratio of the dispersion to the dispersion slope, is preferably between 290 and 330 nm, more preferably between 300 and 320 nm. In some preferred embodiments, the optical effective area is over 110 µm² and in other embodiments greater than 120 µm². A few exemplary fibers have been shown in Table 1 and Table 2, with their profile parameters specified in Table 1 and optical properties shown in Table 2. They have effective areas between about 110 µm² and 155 µm² at 1550 nm and MFDs between 11.4 µm and 14.2 µm and dispersion slopes between 0.06 ps/nm²/km and 0.065 ps/nm²/km. One advantage of the design is that the cable cutoff wavelength for the core is preferably lower than 1450 nm, more preferably lower than 1400 nm, even more preferably lower than 1350 nm.

The bending losses may be minimized by choosing: (i) the proper location of the second annular region and (ii) proper values of the volume of the second annular region 50, which volume is defined as the product of the cross sectional area of the second annular region's sectional area and the absolute value of delta $\Delta_{3min}$ in percent. The volume of the second annular region 50 affects actual the fiber and cable cutoff wavelengths. To have a cable cutoff wavelength less than 1500 nm, it is preferable that the absolute value of the volume $|V_3|$ of the second annular region 50 be less than about 80%-µm². This condition yields a cable cutoff that is approximately equal to the theoretical cutoff of the core. If the volume $|V_3|$ of the second annular region is greater than about 80%-µm², the cable cutoff wavelength may be greater than the theoretical cutoff or even longer than 1550 nm. However, because the theoretical cutoff wavelength for the core is below 1500 nm, this kind of fiber can be still used in the single mode fiber systems operating in the 1550 nm window by using a standard single mode fiber launching and receiving technique to ensure single mode operation.

As discussed above, second annular region 50 can be formed either by down doping (e.g. by use of Fluorine dopant) or by having a plurality of gas filed holes (e.g. air filled holes) imbedded in the second annular fiber region 50. The bending performance calculated in Table 2 is based on the use of the effective refractive index in the second annular region. Therefore, bending properties are applicable to both types of optical fiber (i.e., fiber that is Fluorine doped, or that has air holes in the region 50). Bending performance is an important property of optical fibers. In a conventional large area fiber (with Aeff greater than about 95 µm² or larger) the bending performance degrades dramatically as the optical effective area increases. However, optical fibers according to the embodiments of present invention exhibit very small bend loss even when their effective areas exceed 100 µm², or 110 µm², 112 µm², 115 µm² or more. Optical fibers according to the present invention, for example fibers disclosed in Table 1 and 2, exhibit superior bend loss resistance, both in terms of macrobend and macrobend in a level comparable or better than conventional fibers with known and acceptable bending performance such as SMF-28e®.

In order to predict the macrobending performance of the fibers, we have used finite element method to model the bending properties of the optical waveguide. The predicted modeling results were compared to the bending properties of fibers with known and measured bending performance. Although the numerical modeling results in some cases are not exactly the same as the measured bending results, the numerical modeling gives accurate relative results when compared to other (different) fibers and/or at different bending diameters. Therefore, we have chosen to calculate the bending performance relative to a well known fiber with measured bending results, such as SMF-28e® fiber. (See Table 2.) The bending losses of the measured reference SMF-28e® fiber at 1550 nm are 2.9 dB/turn at 15 mm bending diameter, 0.58 dB/turn at 20 mm bending diameter and 0.02 dB/turn at 30 mm bending diameter. The SMF-28e® fiber has an effective area of about 83 µm².

Some embodiments of the optical fiber of the present invention optical fiber have bending losses at 1550 nm of no more than 0.7 dB/turn, preferably no more than 0.50 dB/turn and preferably less than 0.4 dB/turn and even more preferably less than 0.35 dB/turn at 20 mm bending diameter; and/or less than 0.01 dB/turn at 30 mm bending diameter. Some embodiments of the optical fiber of the present invention optical fiber have bending losses at 1550 nm of no greater than about 0.25 dB/turn, preferably less than 0.20 dB/turn, more preferably less than 0.1 dB/turn, at 20 mm bending diameter, and/or no greater than 0.008 dB/turn at 30 mm bending diameter. Some embodiments of the optical fiber of the present invention optical fiber have bending losses at 1550 nm of no greater than about 0.05 and preferably less than 0.03 dB/turn at 20 mm bending diameter and/or no greater than 0.006 dB/turn at 30 mm bending diameter. Some embodiments of the optical fiber of the present invention optical fiber have bending losses at 1550 nm of no greater than about 0.01 dB/turn at 20 mm bending diameter and/or no greater than 0.003 dB/turn at 30 mm bending diameter.

The bending performance can be also optimized by changing the location and the volume of the second annular region 50. For example, fiber 3 (Tables 1 and 2) has better bending performance than reference fiber SMF-28e® at 20 mm bending diameter at 1550 nm and worse bending performance at 30 mm bending diameter at 1550 nm. By changing the parameters of the second annular region while keeping the same core parameters, we show a much improved fiber in terms of bending (fiber 4, Tables 1 and 2). The improvement of the bending performance in fiber 4 over fiber 3 is due to both the more optimized location of the second annular region, (further away from the core), and the larger absolute volume of the second annular region. Moving the second annular region closer to the center of the core can have the effect of increasing the dispersion and slope. The choice of the location of the second annular region 50 is influenced by a few factors, including the fiber dispersion, dispersion slope and the bending performance (i.e., low bend induced loss). For each fiber in Table 1 and 2 with a specified optical effective area (Aeff at 1550 nm greater than 95 $\mu m^2$ and preferably greater than 110 $\mu m^2$, and more preferably greater than 115 $\mu m^2$), the parameters of second annular region 50 are chosen to yield satisfactory bending performance. In addition to choosing the proper location of the second annular region, bending induced loss is minimized by increasing the volume of the second annular region 50. Tables 1 and Table 2 demonstrate that the increase the volume of the second annular region improves bending performance (i.e., lowers bend induced losses). More specifically, Table 2 shows that even fibers with much larger optical effective area than SMF-28e® (e.g., fibers 5, 6 and 7) have better bending performance than SMF-28e® fiber (which has a much smaller optical effective area at 1550 nm). However, when the volume of the second annular region is too large, it may trap light inside, making the fiber multimoded. In this case, because the core is still single moded, we can still use a single mode launch technique to ensure single mode operation. By single mode launch technique, we mean that the optical signal is launched into the transmission fiber through a standard single mode fiber and another single mode fiber is used to couple of the output end of the transmission fiber to the receiver. Preferably the standard single mode and transmission fibers are sufficiently well-aligned to yield splice losses less than 0.5 dB, more preferably less than 0.3 dB.

We have fabricated two fibers which exemplify the present invention, Fiber 8 and Fiber 9, with the properties given in Tables 3 and 4. The second annular section of Fiber 8 is comprised of silica glass doped with fluorine and has minimum relative refractive index of −0.47 with respect to the silica outer cladding. The second annular section of Fiber 9 is comprised of silica glass with a plurality of closed holes filled with Argon gas. Fiber 8 and Fiber 9 have rounded step index core with maximum refractive indices of 0.19 and 0.28%, respectively.

TABLE 3

|  | Fiber 8 | Fiber 9 |
|---|---|---|
| $\Delta_{1MAX}$ (%) | 0.19 | 0.28 |
| $\Delta_2$ (%) | 0 | 0 |
| R1 (μm) | 7.0 | 6.1 |

TABLE 3-continued

|  | Fiber 8 | Fiber 9 |
|---|---|---|
| V1 (%-μm$^2$) | 7.7 | 8.5 |
| R2 (μm) | 13.6 | 11.1 |
| R1/R2 | 0.51 | 0.55 |
| R2$_{MID}$ (μm) | 10.3 | 8.6 |
| W2 m) | 6.6 | 5.0 |
| W$_3$ (μm) | 5.1 | 3.5 |
| R$_{3MID}$ | 16.15 | 12.9 |
| |V$_3$| (μm$^2$ %) | 62 | 103 |

TABLE 4

Measured optical properties of two fabricated embodiments

| Examples | Fiber 8 | Fiber 9 |
|---|---|---|
| MFD in microns (μm), at 1550 nm | 14.6 | 11.5 |
| Aeff (μm$^2$) at 1550 nm | 167 | 105 |
| Attenuation at 1550 nm (dB/km) | 0.212 | 0.204 |
| Dispersion at 1550 nm (ps/nm/km) | 20.5 | 19.05 |
| Slope at 1550 nm (ps/nm$^2$/km) | 0.064 | 0.064 |
| Kappa at 1550 nm (nm) | 318 | 298 |
| 1 turn around 10 mm diameter mandrel, macrobend at 1550 nm (dB) | 3.78 | 0.28 |
| 1 turn around 15 mm diameter mandrel, macrobend at 1550 nm (dB) | 1.23 | 0.026 |
| 1 turn around 20 mm diameter mandrel, macrobend at 1550 nm (dB) | 0.61 | 0.005 |
| Cable Cutoff (nm) | 1250 | 1414 |

We have also found that a higher core volume generally not only tends to increase the size of the mode field, but also raises the LP11 theoretical cutoff wavelength, and therefore tends to raise the 2 m fiber cutoff wavelength. In some embodiments, the profile volume of the core, $V_1$, is greater than 5.0%-μm$^2$ and less than 9.0%-μm$^2$, and in some embodiments, $V_1$ is between 6.50%-μm$^2$ and 7.5%-μm$^2$.

The core 20 of the optical fiber 10 shown in FIGS. 1, 2 and 3 has a refractive index profile having either a step shape, or a rounded step shape or an alpha shape with the alpha taking a finite value. However, the core 20 could have other values of $\alpha_1$, or the core could have a profile shape other than an alpha profile, such as a multi-segmented core.

Preferably, the optical fibers disclosed herein have low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. Nos. 6,477,305, 6,904,772, and PCT Application Publication No. WO01/47822.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:

a glass core extending from a centerline to a radius $R_1$ wherein $R_1$ is greater than about 5 μm; a glass cladding surrounding and in contact with the core, wherein the core and the cladding provide a fiber with cable cutoff less than 1500 nm, and an effective area at 1550 nm greater than 110 μm² and bend loss of ≦0.7 dB/turn on a 20 mm diameter mandrel and, wherein (i) the cladding comprises:
 a first annular region extending from the radius $R_1$ to a radius $R_2$, the first annular region comprising a radial width, $W_2=R_2-R_1$,
 a second annular region extending from the radius $R_2$ to a radius $R_3$, and comprising a radial width, $W_3=R_3-R_2$, and
 a third annular region surrounding the second annular region and extending from the radius $R_3$ to an outermost glass radius $R_4$; and (ii) the core comprises a maximum relative refractive index, $\Delta_{1MAX}$, relative to the third annular region;
 wherein the first annular region has a refractive index delta $\Delta_2(r)$;
 wherein the second annular region comprises:
  a minimum relative refractive index, $\Delta_{3MIN}$, relative to the third annular region;
 wherein $\Delta_{1MAX}>\Delta_{2MAX}>\Delta_{3MIN}$, $\Delta_{2MIN}>\Delta_{3MIN}$, and $\Delta_3MIN<0$ wherein $\Delta_{1MAX}$ is greater than about 0.1% and less than about 0.3%; and $\Delta_2(r)$, is less than about 0.025%, and wherein $\Delta_{3MIN}$, relative to the third annular region, is less than about −0.1%.

2. The optical fiber of claim 1, wherein $\Delta_{3MIN}$, relative to the third annular region, is less than about −0.3%.

3. The optical fiber of claim 1 wherein the second annular region comprises a profile volume, $V_3$, equal to:

$$2\int_{R_2}^{R_3}\Delta(r)r\,dr;$$

wherein $|V_3|$ is at least 20%-μm².

4. An optical fiber comprising:

a glass core extending from a centerline to a radius $R_1$ wherein $R_1$ is greater than about 5 μm; a glass cladding surrounding and in contact with the core, wherein the core and the cladding provide a fiber with cable cutoff less than 1500 nm, and an effective area at 1550 nm greater than 110 μm² and bend loss of ≦0.7 dB/turn on a 20 mm diameter mandrel and, wherein (i) the cladding comprises:
 a first annular region extending from the radius $R_1$ to a radius $R_2$, the first annular region comprising a radial width, $W_2=R_2-R_1$,
 a second annular region extending from the radius $R_2$ to a radius $R_3$, and comprising a radial width, $W_3=R_3-R_2$, and
 a third annular region surrounding the second annular region and extending from the radius $R_3$ to an outermost glass radius $R_4$; and (ii) the core comprises a maximum relative refractive index, $\Delta_{1MAX}$, relative to the third annular region;
 wherein the first annular region has a refractive index delta $\Delta_2(r)$;
 wherein the second annular region comprises:
  a minimum relative refractive index, $\Delta_{3MIN}$, relative to the third annular region;

wherein $\Delta_{1MAX}>\Delta_{2MAX}>\Delta_{3MIN}$, $\Delta_{2MIN}>\Delta_{3MIN}$, and $\Delta_{3MIN}<0$, wherein said second annular region comprises silica based glass with a plurality of closed randomly dispersed holes situated therein.

5. The optical fiber of claim 4, wherein said second annular region comprises silica based glass with at least 50 closed randomly dispersed holes situated therein, and (i) mean distance between the holes is less than 5000 nm, and (ii) at least 80% of the holes have a maximum cross-sectional dimension Di of less than 1000 nm.

6. The optical fiber of claim 2, wherein the core in combination with the cladding provide a bend loss at 1550 nm wavelength of less than 0.25 dB/turn on a 20 mm diameter mandrel.

7. The optical fiber of claim 2, wherein the core in combination with the cladding provide a bend loss at 1550 nm wavelength of less than 0.10 dB/turn on a 20 mm diameter mandrel.

8. The optical fiber of claim 3 wherein 20%-μm²<$|V_3|$<80%-μm².

9. The optical fiber of claim 2, wherein $R_2$>10 μm.

10. An optical fiber comprising:

a glass core extending from a centerline to a radius $R_1$ wherein $R_1$ is greater than about 5 μm; a glass cladding surrounding and in contact with the core, wherein the core and the cladding provide a fiber with cable cutoff less than 1500 nm, and an effective area at 1550 nm greater than 110 μm² and bend loss of ≦0.7 dB/turn on a 20 mm diameter mandrel and, wherein (i) the cladding comprises:
 a first annular region extending from the radius $R_1$ to a radius $R_2$, the first annular region comprising a radial width, $W_2=R_2-R_1$,
 a second annular region extending from the radius $R_2$ to a radius $R_3$, and comprising a radial width, $W_3=R_3-R_2$, and
 a third annular region surrounding the second annular region and extending from the radius $R_3$ to an outermost glass radius $R_4$; and (ii) the core comprises a maximum relative refractive index, $\Delta_{1MAX}$, relative to the third annular region;
 wherein the first annular region has a refractive index delta $\Delta_2(r)$;
 wherein the second annular region comprises:
  a minimum relative refractive index, $\Delta_{3MIN}$, relative to the third annular region;
wherein $\Delta_{1MAX}>\Delta_{2MAX}>\Delta_{3MIN}$, $\Delta_{2MIN}>\Delta_{3MIN}$, and $\Delta_{3MIN}<0$, wherein said effective area is at least 125 μm².

11. The optical fiber of claim 10 wherein said effective area is at least 135 μm².

12. An optical fiber comprising:

a glass core extending from a centerline to a radius $R_1$ wherein $R_1$ is greater than about 5 μm; a glass cladding surrounding and in contact with the core, wherein the core and the cladding provide a fiber with cable cutoff less than 1500 nm, and an effective area at 1550 nm greater than 110 μm² and bend loss of ≦0.7 dB/turn on a 20 mm diameter mandrel and, wherein (i) the cladding comprises:
 a first annular region extending from the radius $R_1$ to a radius $R_2$, the first annular region comprising a radial width, $W_2=R_2-R_1$,
 a second annular region extending from the radius $R_2$ to a radius $R_3$, and comprising a radial width, $W_3=R_3-R_2$, and a third annular region surrounding the second annular region and extending from the radius $R_3$ to an outermost glass radius $R_4$; and (ii) the core comprises a maximum relative refractive index, $\Delta_{1MAX}$, relative to the third annular region;

wherein the first annular region has a refractive index delta $\Delta_2(r)$;

wherein the second annular region comprises:

a minimum relative refractive index, $\Delta_{3MIN}$, relative to the third annular region;

wherein $\Delta_{1MAX} > \Delta_{2MAX} > \Delta_{3MIN}$, $\Delta_{2MIN} > \Delta_{3MIN}$, and $\Delta_{3MIN} < 0$, wherein $\Delta_{1MAX}$ is greater than about 0.1% and less than about 0.3%; and $\Delta_2(r)$, is less than about 0.025%, and wherein $W_3$ is between 1 μm and 10 μm.

13. The optical fiber of claim 2, wherein $R_1/R_2$ is between about 0.3 and 0.4.

14. An optical fiber comprising:

a glass core extending from a centerline to a radius $R_1$ wherein $R_1$ is greater than about 5 μm;

a glass cladding surrounding and in contact with the core, the cladding comprising:

a first annular region extending from $R_1$ to a radius $R_2$, the first annular region comprising a radial width, $W_2 = R_2 - R_1$, a second annular region extending from $R_2$ to a radius $R_3$, and comprising a radial width, $W_3 = R_3 - R_2$, and a third annular region surrounding the second annular region and extending from the radius $R_3$ to an outermost glass radius $R_4$;

wherein the core comprises a maximum relative refractive index, $\Delta_{1MAX}$, relative to the third annular region, and wherein $\Delta_{1MAX}$ is greater than about 0.1% and less than about 0.3%;

wherein the first annular region has a refractive index delta $\Delta_2(r)$ is less than about 0.025%;

wherein the second annular region comprises:

a minimum relative refractive index, $\Delta_{3MIN}$, relative to the third annular region;

wherein $\Delta_{1MAX} > \Delta_{2MAX} > \Delta_{3MIN}$, $\Delta_{2MIN} > \Delta_{3MIN}$ and $\Delta_{3MIN} < 0$, and includes silica based glass with at least 10 randomly dispersed closed holes situated therein, and (i) mean distance between the holes is less than 5000 nm, and (ii) at least 80% of the holes have a maximum cross-sectional dimension Di of less than 1000 nm; and wherein the core and the cladding provide a fiber with cable cutoff less than 1500 nm, and an effective area at 1550 nm greater than 95 μm² and bend loss of no more than 0.5 dB/turn on a 20 mm diameter mandrel.

15. The optical fiber of claim 14 wherein said second annular region includes at least 50 randomly dispersed closed holes situated therein.

16. The optical fiber of claim 14 wherein $R_2 > 12$ μm and $W_3$ is 2 μm to 10 μm.

17. The optical fiber of claim 14 wherein the core and the cladding provide a fiber with cable cutoff less than 1450 nm.

18. The optical fiber of claim 14 wherein the bend loss of said fiber is less than 0.25 dB/turn at 20 mm bending diameter and less than 0.01 dB/turn at 30 mm bending diameter.

19. An optical fiber comprising:

a glass core extending from a centerline to a radius $R_1$ wherein $R_1$ is greater than about 5 μm;

a glass cladding surrounding and in contact with the core, the cladding comprising:

a first annular region extending from $R_1$ to a radius $R_2$, the first annular region comprising a radial width, $W_2 = R_2 - R_1$, a second annular region extending from $R_2$ to a radius $R_3$, and comprising a radial width, $W_3 = R_3 - R_2$, and a third annular region surrounding the second annular region and extending from the radius $R_3$ to an outermost glass radius $R_4$;

wherein the core comprises a maximum relative refractive index, $\Delta_{1MAX}$, relative to the third annular region, and wherein $\Delta_{1MAX}$ is greater than about 0.1% and less than about 0.3%;

wherein the first annular region has a refractive index delta $\Delta_2(r)$ is less than about 0.025% and larger than about −0.025%;

wherein the second annular region comprises:

a minimum relative refractive index, $\Delta_{3MIN}$, relative to the third annular region;

wherein $\Delta_{1MAX} > \Delta_{2MAX} > \Delta_{3MIN}$, and $\Delta_{2MIN} > \Delta_{3MIN}$ and $\Delta_{3MIN} < -0.1\%$, and wherein the core and the cladding provide a fiber with cable cutoff less than 1500 nm, and an effective area at 1550 nm greater than 95 μm² and bend loss of no more than 0.7 dB/turn on a 20 mm diameter mandrel.

20. The optical fiber of claim 19 wherein said second annular region comprises at least one of: i) fluorine; ii) closed randomly dispersed holes.

21. The optical fiber of claim 19 wherein said fiber has a dispersion of 21 ps/nm/km or less at a wavelength of 1550 nm.

22. The optical fiber of claim 19 wherein said fiber has $\Delta_{1MAX}$ of greater than 0.17% and less than 0.28%.

23. The optical fiber of claim 19, wherein said effective area at 1550 nm is greater than 125 μm².

24. The optical fiber of claim 23 wherein said effective area at 1550 nm is not greater than 167 μm².

25. The optical fiber of claim 19, wherein the ratio of the $R_1$ to the radius $R_2$ is: $0.2 < R_1/R_2 < 0.4$.

26. The optical fiber of claim 4, wherein said effective area at 1550 nm is greater than 125 μm².

* * * * *